United States Patent [19]

Tomiyama et al.

[11] Patent Number: 5,408,745
[45] Date of Patent: Apr. 25, 1995

[54] METHOD OF PRODUCTING CRANKSHAFTS

[75] Inventors: Hiromu Tomiyama, Kure; Yuzo Uotani, Higashihiroshima, both of Japan

[73] Assignee: Mazda Motor Corporation, Hiroshima, Japan

[21] Appl. No.: 92,532

[22] Filed: Jul. 16, 1993

[30] Foreign Application Priority Data

Jul. 16, 1992 [JP] Japan ................... 4-189698

[51] Int. Cl.⁶ ............................. B23P 15/00
[52] U.S. Cl. .................. 29/888.08; 29/888; 29/33 C
[58] Field of Search ............ 29/888.08, 888, 33 C, 29/33 K, 38 E; 51/165.71, 165.74

[56] References Cited

U.S. PATENT DOCUMENTS 3,948,076 4/1976 Eitel ...................... 29/888.08
4,030,172 6/1977 Gentry .................. 29/888.08

FOREIGN PATENT DOCUMENTS 0417446 7/1990 European Pat. Off. ......... 29/888.08
2-41730 2/1990 Japan .
4-201135 7/1992 Japan .................. 29/888.08

*Primary Examiner*—Irene Cuda
*Attorney, Agent, or Firm*—Keck, Mahin & Cate

[57] ABSTRACT

In a method of producing crankshafts in a mass-production line, after a crankshaft casting is ground to its specified geometry, it is measured to detect a dynamic imbalance. Then, at least one radial balancing bore is drilled in a specified counterweight to a depth according to a resultant imbalance so as to balance the crankshaft if the crankshaft is judged, based on the resultant imbalance, to fall within a region in which a dynamic imbalance is eliminated by drilling bores. Otherwise, the crank shaft is removed out of the mass-production line if it is judged to be out of the region.

5 Claims, 4 Drawing Sheets

METHOD OF PRODUCING CRANKSHAFTS

BACKGROUND OF THE INVENTION

1. Field of the Invention

This invention relates to a method of producing crankshafts, and, in particular, to a method for producing crankshafts by which the incidence of crankshafts with defective dynamic balance is reduced so that it is as low as possible.

2. Description of Related Art

A process is known by which crankshafts, which have been profiled in a specific shape by, for instance, forging, are processed or machined to grind their counterweights to specific outer diameters and to finish their associated elements. During final processing, a measurement is taken of dynamic balance of each crankshaft in order to judge the need to make corrective balancing of the crankshaft. In this instance, a dynamic imbalance of a crankshaft is represented by a positional deviation of the center of gravity of the crankshaft from the intended center of gravity. Based on the resultant imbalance or deviation of the center of gravity, dynamic balancing is accomplished by drilling, with a drilling machine, a radial balancing bore or bores in counterweights, generally in counterweights located at the ends of the crankshaft. This processing, including the final balancing, is automated in a production-line system. Such a crankshaft producing method is known from, for instance, Japanese Unexamined Patent Publication No. 2-41730.

The apparatus described in the publication mentioned above accomplishes balancing of a crankshaft by drilling radial balancing bores to specific depths according to existing imbalance, namely a positional deviation of the center of gravity from the intended center of gravity of the crankshaft, in a specified counterweight of the crankshaft in order to offset the center of gravity in the crankshaft as close as possible to the intended center of gravity. Consequently, there are limits of correctable imbalances. That is, if a maldistribution of the mass, attributable to which a dynamic imbalance occurs, is out of a specific area of the specified counterweight in which radial balancing bores can be successfully drilled to correct the dynamic imbalance of the crankshaft, then, the dynamic balance correction cannot be accomplished by the apparatus.

Consequently, measuring of dynamic imbalance is carried out to remove defective crankshafts with dynamic imbalances which are not corrective from the production-line system. Such a defective crankshaft is properly balanced by manual drilling of radial balancing bores in a counterweight on the side where the center of gravity is deviated in the crankshaft.

For the purpose of providing an understanding of the correctable area of a counterweight for imbalance correction, reference is made to FIG. 6, which shows polar coordinates defining an imbalance correctable area of a counterweight of, for example, a crankshaft of a V-type six cylinder engine. For dynamic balancing of this crankshaft, either one of the counterweights, located at opposite ends of the crankshaft with a difference of crank angle of 180 degrees, is formed with up to four radial balancing bores. These bores have to be formed at peripheral points of the counterweight $+/-30$ degrees and $+/-45$ degrees from the center line CL of the counterweight. The maximum imbalance, which can be corrected by means of the radial balancing bores at $+/-45$ degree locations is 250 g/cm, whereas the maximum imbalance, which can be corrected by means of the radial balancing bores at $+/-30$ degree locations is 100 g/cm. That is, when manifesting a maximum imbalance which can be corrected by the four radial balancing bores formed in one end counterweight by means of vectors $\alpha$, $\beta$, $\tau$ and $\delta$ and $\alpha$, $\beta'$, $\tau'$ and $\delta'$, imbalance correction is enabled successfully with radial balancing bores formed only within the composed regions (A) and (A') by these vectors.

Unfinished crankshaft elements, such as forged crankshafts, even for the same type of engine, may have statistic tendencies of imbalances, i.e. deviations of the center of gravity from the intended center of gravity, which are attributable to production lots in which different casting molds are used and which are prepared different days. Heretofore, various processes, including grinding counterweights to their tolerable outer diameters, are applied to crankshafts uniformly for all production lots without giving consideration to the tendencies of imbalances occurring to forged crankshafts in different production lots. Because of this, if the accuracy of unfinished crankshafts, i.e. crankshaft castings, in the same production lot is low, there may be produced a significant number of finished crankshafts with defective dynamic balances which are impossible to be corrected in the final production stage. In such a case, unanticipated manual correction requirements may disrupt seriously the production schedule.

SUMMARY OF THE INVENTION

It is an objective of the present invention to provide a method of producing crankshafts in which there is accumulated data which indicates a tendency of imbalance to occur (a tendency of distribution of deviations of the center of gravity from the intended location) in unfinished crankshafts peculiar to a production lot and is reflected to grinding of counterweights so as to prevent a number of crankshafts from being manufactured with defective balances even though the manufacturing accuracy in aspects of the geometry of unfinished crankshafts is low in the production lot.

The foregoing object of the present invention is accomplished by providing a method of automatically manufacturing crankshafts in a mass-production line which includes a grinding process for grinding all counterweights of a crankshaft element, such as a crankshaft casting, to their specified outer diameters and a machining process for finishing the crankshaft element to its specified geometry. After these processes, a measurement of dynamic imbalance of the finished crankshaft is conducted so as to drill at least one radial balancing bore to a depth according to a resultant imbalance of the crankshaft in either one of the two opposite end counterweights so as to balance it if it is judged, based on the resultant imbalance, to fall within a balance correctable region in which a dynamic imbalance is eliminated by drilling radial balancing bores. Otherwise, the finished crankshaft is removed out of the mass-production line if the finished crankshaft is judged to be out of the balance correctable region. For mass-producing crankshafts lot by lot, trial manufacturing is conducted or a specific number of crankshaft elements sampled from every manufacturing lot through the grinding and finishing processes prior to mass-production of the production lot. Afterwards, dynamic imbalances of the sampled crankshaft elements that have been ground and finished are measured. The tendency of imbalance of crankshaft elements involved occurring in the manufacturing lot is analyzed, and corrective outer diameters of the counterweights, which enables the crankshaft elements in the manufacturing lot, after having been ground and finished to fall within the balance correctable region, are calculated. The data representative of the corrective diameters is fed back to the counterweight grinding process so as to grind all of counterweights of crankshaft elements from the same manufacturing lot to the corrective outer diameters.

According to the method of manufacturing crankshafts of the present invention, calculations are made with respect to the outer diameters of counterweights which make the crankshaft fall within a range in which an automatic corrective processing is applicable to properly balance the crankshaft. During the counterweight grinding process, since counterweights are ground to the outer diameters calculated and corrected according to imbalance measurements, the incidence of crankshafts with defective dynamic balance is greatly reduced or eliminated.

Further, a specified number of sample crankshafts, sampled from each lot, is subjected to a trial production, and dynamic balances of the sample crankshafts, having been finished, are measured. As a result of the dynamic balance measurements, calculations are made with respect to the outer diameters of counterweights which make the crankshaft fall within the balance correctable range, and an analysis is conducted with regard to the tendency of occurrence of imbalance for crankshafts in the same production lot. Counterweights are ground to the calculated outer diameters, respectively, which information has been fed back to the counterweight grinding process, during mass production, so as to make almost all crankshafts from the same production lot properly correctable in dynamic balance through the balancing processes. Since there are slight variations in the outer measurements for the counterweights between production lots, when measuring dynamic balances of crankshafts in the final balancing stage during mass production, it is possible to prevent a large number of defective crankshafts from being manufactured. Therefore, disruption of the production schedule for the crankshafts can be avoided, and the need for manual balance corrective processing is also avoided as well, thereby resulting in an improvement in production efficiency.

BRIEF DESCRIPTION OF THE DRAWINGS

The above and other objects and features of the present invention will be clearly understood from the following description with respect to a preferred embodiment thereof when considering it in conjunction with the drawings, in which.

DETAILED DESCRIPTION OF THE PREFERRED EMBODIMENT

Figure 1:
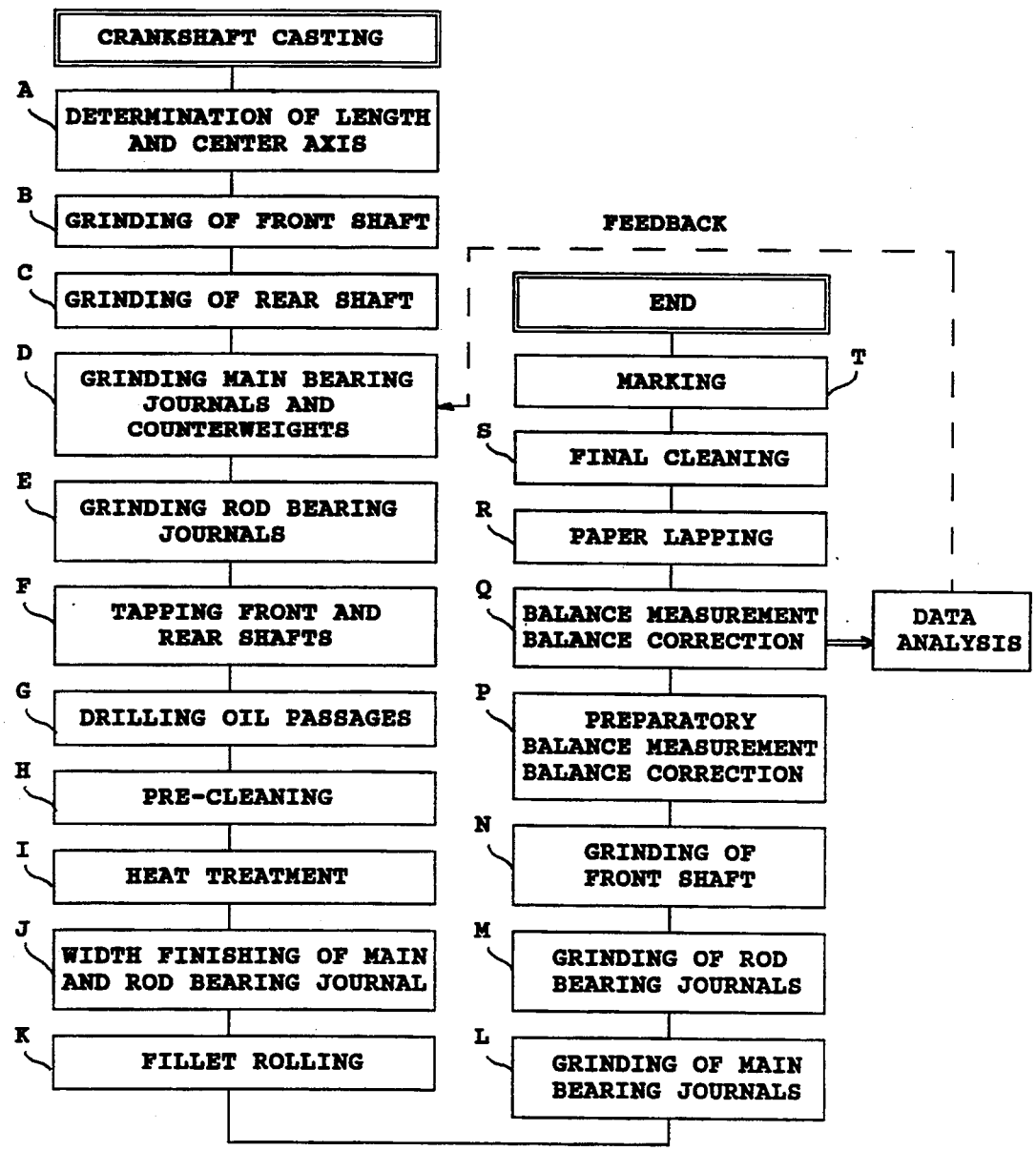
FIG. 1 is a block diagram showing a production process of the method of manufacturing crankshafts in accordance with a preferred embodiment of the present invention.

Referring to the drawings in detail, in particular to FIGS. 1 through 4, a crankshaft 2 for a six cylinder engine, which is produced by a method of this invention, is shown by way of example. This crankshaft 2 has four main bearing journals 4a, 4b, 4c and 4d, which are aligned with a journal center axis Q, six rod bearing journals 6(#1), 6(#2), 6(#3), 6(#4), 6(#5) and 6(#6) respectively arranged so that two of the journals 6 are located between adjacent main bearing journals 4, and nine counterweights 8a, 8b, 8c, 8d, 8e, 8f, 8g, 8h and 8i which are arranged one between each adjacent main bearing journal 4 and rod bearing journal 6 and each of the adjacent rod bearing journals 6.

In this instance, the end counterweights 8a and 8i at both ends of the crankshaft 2, which are arranged so as to have an angular phase difference of 180 degrees therebetween, are identical in configuration and are larger than the remaining counterweights 8b-8g. Each of the end counterweights 8a and 8i is formed into a sector like shape with a sector angle of approximately 120 degrees. The second counterweights 8b and 8h, second from the end counterweights 8a and 8i, respectively, which are arranged so as to have an angular phase difference of 120 degrees therebetween, and the center counterweights 8c are identical in configuration and are formed into a sector like shape with a sector angle of approximately 80 degrees. These second and center counterweights 8b, 8h and 8c are smaller than the end counterweights 8a and 8i. Furthermore, the remaining counterweights 8c, 8d, 8f and 8g, which are smaller than the second and center counterweights 8b, 8h and 8c, are formed so that they are elliptical in shape. These elliptical counterweights 8c, 8d, 8f and 8g hardly act as counterweights but rather function as crank arms.

Figure 2:
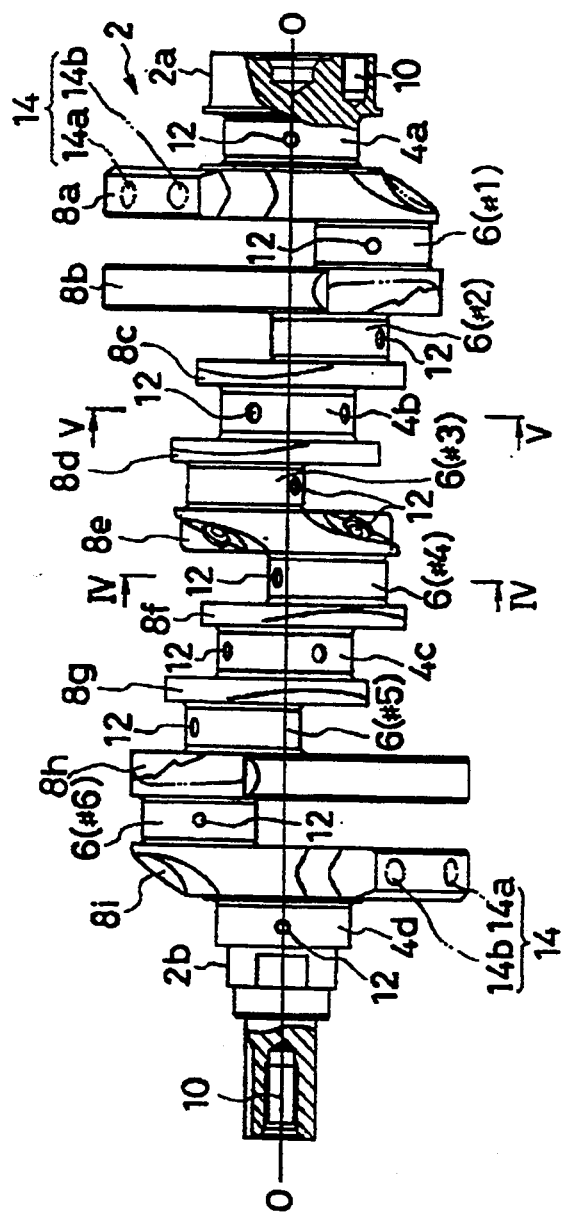
FIG. 2 is a plan view of a crankshaft for a 6-cylinder engine, which is manufactured by means of the method of the present invention.
Figure 3:
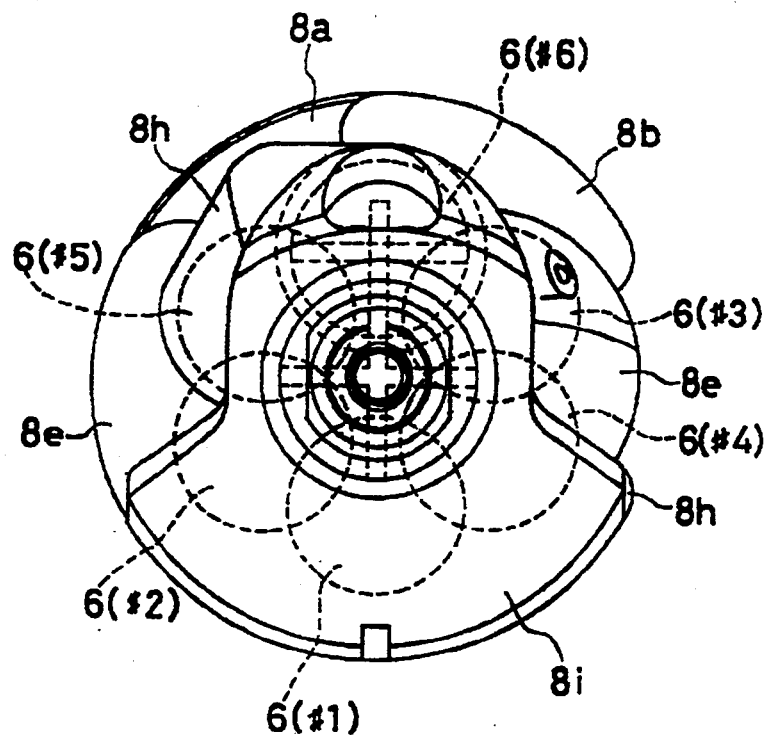
FIG. 3 is a side view of FIG. 2.
Figure 4:
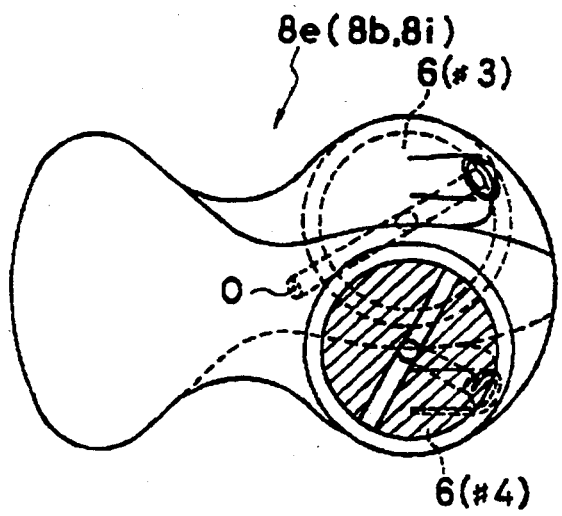
FIG. 4 is a cross-sectional view taken along line IV—IV of FIG. 2.
Figure 5:
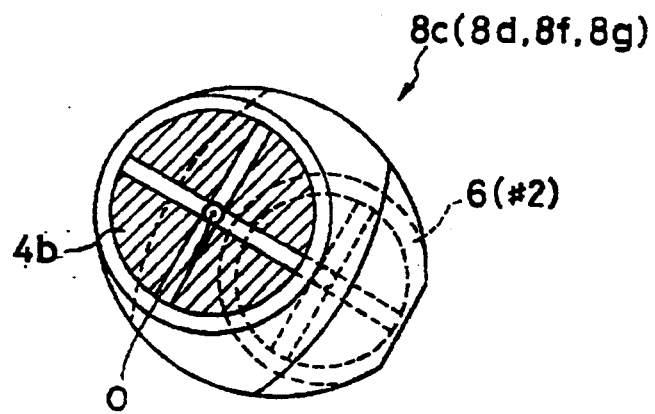
FIG. 5 is a cross-sectional view taken along line V—V of FIG. 2.

The crankshaft 2 formed described above is produced through production processes schematically illustrated in block diagram in FIG. 2. That is, a crankshaft casting, which has been molded so as to have almost the same configuration as the crankshaft 2 shown in FIG. 1, is directed to a centering process (A) where the crankshaft casting is machined to a specific length and the axis of rotation of the crankshaft casting is determined. Subsequently, in a first grinding process (B), a front end shaft 2a is ground to a specified outer diameter, and then, in a second grinding process (C), a rear end shaft 2b is ground to a specified outer diameter. In a third grinding process (D), all of the main bearing journals 4a-4d and the counterweights 8a-8i are ground to their specified outer diameters and outer shapes. Subsequently, all of the rod bearing journals 6(#1)-6(#6) are ground to their specified outer diameters in a fourth grinding process (E).

Thereafter, various bores are formed in two subsequent processes. That is, in a first drilling process (F), necessary bores, such as tap bores 10 are formed in both axial ends. Further, in a second drilling process (G), a plurality of lubricating oil passages 12 are formed in the crankshaft casting 2. Then, after pre-cleansing the crankshaft casting 2 in a precleaning process (H), a heat treatment is conducted on the crankshaft casting 2 in a heat treatment process (I). Then, after the width of each of the main bearing journals 4a-4d and the rod bearing journals 6(#1)–6(#2) has been finished in a finishing process (J), fillet rolling is executed in a fillet rolling process (K). Following this processing, the crankshaft casting 2 is machined to grind and finish the main bearing journals 4a–4d, the rod bearing journals 6(#1)–6(#6) and the front end shaft 2a to their specified outer diameters in grinding processes (L), (M) and (N), respectively, in this order so as to complete a geometrical shape of the crankshaft 2.

Thereafter, the crankshaft 2 is directed to a preparatory balancing process (P) where the dynamic balance of the crankshaft 2 is measured, and, on the basis of the measured dynamic imbalance, radial balancing bores 14a are drilled in the outer periphery of either one of the end counterweights 8a and 8i, given a difference in crank angle of approximately 180 degrees therebetween, to a depth corresponding to the dynamic imbalance of the crankshaft 2 for a preparatory polar balance correction. In this preparatory or primary polar balance correction, radial balancing bores 14a are formed in positions of +/−30 degrees from the center CL in the selected one of the end counterweights 8a and 8i so as to offset the center of gravity closer to the center line CL, thereby reducing the imbalance (see FIG. 6).

Figure 6:
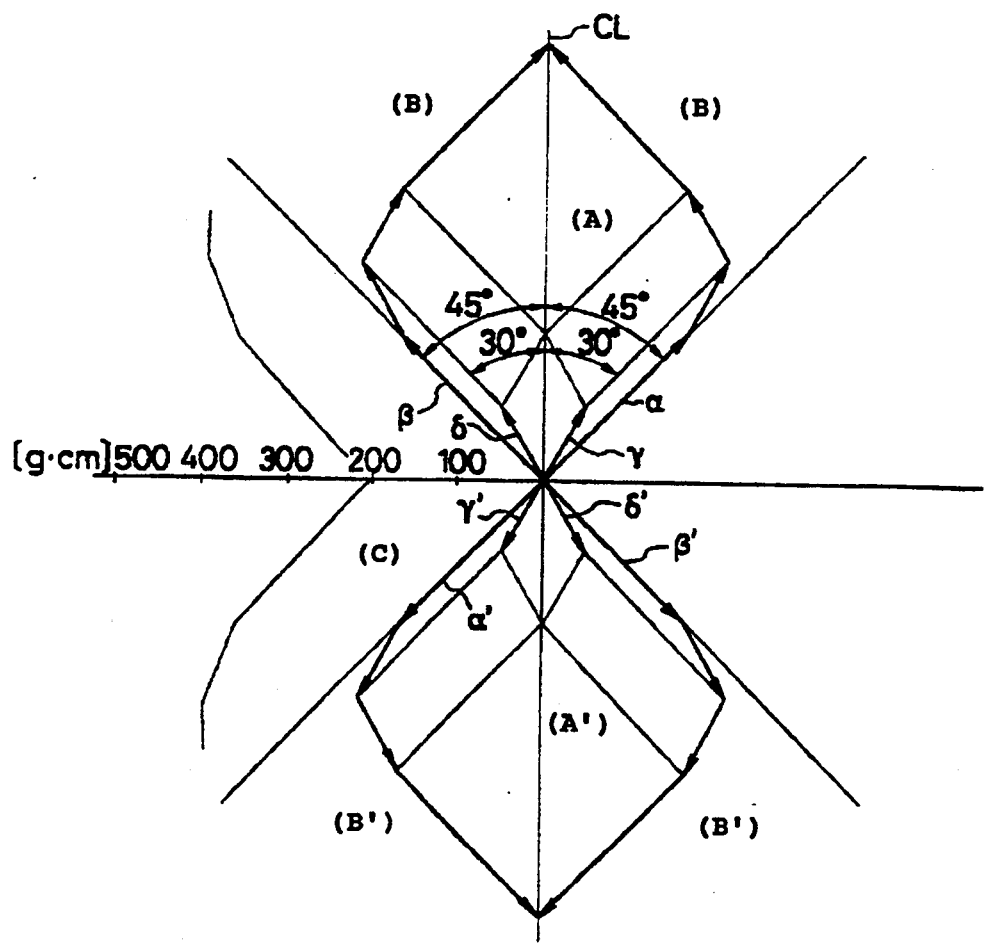
FIG. 6 is a polar coordinates graph showing corrective regions within which imbalance correction is successfully accomplished.

The crankshaft, which has preparatorily been polar balance corrected, is subsequently subjected to dynamic balance measurement and correction in a final balancing process (Q), where final balance correction is accomplished. In the final balancing process (Q), on the basis of the measurement results of dynamic imbalance, radial balancing bores 14b are drilled to specified depths in positions of +/−45 degrees from the center CL, respectively, in the selected one of the end counterweights 8a and 8i. In other words, in these balancing processes (P) and (Q), as shown in FIG. 6, the imbalance can be eliminated through the composition of vectors $\alpha$, $\beta$, $\tau$ and $\delta$ (or otherwise vectors $\alpha'$, $\beta'$, $\tau'$ and $\delta'$) of the radial balancing bores 14a and 14b.

After the crankshaft has been finally adjusted with respect to imbalance, it is subjected to processes, such as a paper lapping (R), a final cleaning (S) and measuring and marking (T), in order to complete all processing, thereby providing a finished crankshaft 2.

In this instance, the method for producing crankshafts of this invention includes trial manufacturing of crankshafts prior to the mass production of crankshafts through the processes from (A) to (T) for every production lot. In this trial manufacturing, a specified number of, for example 30, forged crankshafts 2 are sampled. These forged sample crankshafts 2 are processed through the processes (A)–(N) so as to provide finished crankshafts 2. During this finishing, the respective counterweights 8a–8i are ground to their standard outer diameters. Each of the finished sample crankshafts 2 is then subjected to dynamic balance measurement and correction in each of the preparatory and final balancing processes (P) and (Q). As a result of dynamic balance measurements in the final balancing process (Q), if all of the finished sample crankshafts 2 are judged to fall within the balance correctable region (A) or (A'), shown in FIG. 6, then, the forged samples of crankshafts which have been sampled are considered to come from a production lot in which individual forged crankshafts can be manufactured with acceptable accuracy. This indicates that, during mass production, grinding counterweights 8a–8i of each of the forged crankshafts 2 to the same diameters as the standard diameters, to which the counterweights 8a–8i of each of the forged sample crankshafts 2 have been ground, enables all of the crankshafts 2, involved in the same production lot, to be finished as crankshafts of acceptable quality. Then, the relevant data of dynamic balance is recorded and preserved.

On the other hand, if, as a result of the dynamic balance measurement made with respect to the production lot, it is determined that some of the finished sample crankshafts 2 are judged to be out of the balance correctable region (A) or (A'), then, an interpretive analysis of the data representative of dynamic balance for each of the individual finished sample crankshafts 2 is conducted to obtain the tendency of occurrence of imbalance for the production lot and, based on the tendency, to calculate outer diameters of the counterweight 8a–8i which enable all of the finished sample crankshafts 2 to fall within the balance correctable region (A) or (A'). Then, the relevant data of dynamic balance and outer diameters is recorded and preserved. That is, for example, in FIG. 6, if an imbalance, namely the center of gravity, of a finished crankshaft 2 falls within a region (B) or (B') outside the balance correctable region (A) or (A') in the direction along the center line CL, then, grinding the counterweight 8a or 8i to an outer diameter smaller than the standard diameter on trial manufacturing enables all of finished crankshafts 2 involved in the production lot to fall within the balance correctable region (A) or (A'). On the other hand, if an imbalance, namely the center of gravity, of a finished crankshaft 2 is within a region (C) outside the balance correctable region (A) or (A') on one side of the center line CL, then, grinding the center counterweight 8e to an outer diameter smaller than the standard diameter on trial manufacturing enables all of the finished crankshafts 2 involved in the production lot to fall within the balance correctable region (A) or (A').

As described above, after a predetermined number of forged sample crankshafts 2, extracted from each of production lots, are trial manufactured, balance measurements are carried out for the finished sample crankshafts. Based on the result of balance measurements, corrective outer diameters of the counterweights 8a–8i, which bring all of crankshafts involved the production lot into the balance correctable region (A) or (A'), are calculated. The data of corrective outer diameters, collected lot by lot, are fed back to the grinding process (D) for journal and counterweight grinding. In a mass-production process, counterweights 8a–8i of each of crankshaft castings from the same production lot are ground to conform with their outer diameters. Consequently, by adjusting outer diameters of respective counterweights 8a–8i according to production lots to conform with tendencies of occurrence of imbalance in the production lots, crankshafts are finished in the mass-production line and fall within the balance correctable region (A) or (A') in spite of the differences between the production lots, so as to prevent a large number of defective crankshafts from being provided directly, notwithstanding any differences in precision between production lots.

Therefore, the problem of disrupting the production schedule of crankshafts is eliminated, and there is little need for manual balance correction of finished crankshafts, resulting in an improvement in productivity.

In adopting the method of manufacturing crankshafts, outer diameter tolerances of counterweights are preferred to be established larger than those in conventional manufacturing method.

It is to be understood that although the present invention has been described with respect to a preferred embodiment thereof, various other embodiments and variants may occur to those skilled in the art which do not depart from the scope and spirit of the invention. Such other embodiments and variants are deemed to fall within and are intended to be covered by the following claims.

What is claimed is:

1. In a method of automatically producing crankshafts in a mass-production line, which includes a grinding process for grinding all counterweights of a crankshaft element to their specified outer diameters, a machining process for finishing said crankshaft element to its specified geometry, a measuring process for measuring a dynamic imbalance of said crankshaft element after it is finished, and a drilling process for drilling at least one radial balancing bore to a depth according to a resultant imbalance of said crankshaft element from said dynamic imbalance in a specified one of said counterweights so as to balance said crankshaft element if said crankshaft element, after it is finished, is judged, based on said resultant imbalance, to fall within a region in which a dynamic imbalance is eliminated by said radial balancing bore and otherwise removing said crankshaft element, after it is finished, out of said mass-production line if said crankshaft element, after it is finished, is judged to be out of said region, the improvement comprising:

(a) sampling a plurality of crankshaft elements and calculating a corrective outer diameter of each of said counterweights which enables a crankshaft element, after having been ground and finished, to fall within said region; and (b) feeding back data, representative of corrective outer diameters of said counterweights of the plurality of crankshaft elements sampled, to said grinding process so as to grind all counterweights of remaining crankshaft elements to said corrective outer diameters.

2. In a method of automatically producing crankshafts, lot by lot, in a mass-production line which includes a grinding process for grinding all counterweights of a crankshaft to their specified outer diameters, a machining process for finishing said crankshaft to its specified geometry, a measuring process for measuring a dynamic imbalance of said crankshaft after it is finished, and a drilling process for drilling at least one radial balancing bore to a depth according to a resultant imbalance of said crankshaft from said dynamic imbalance measured in a specified one of said counterweights so as to balance said crankshaft if said crankshaft, after it is finished, is judged, based on the dynamic imbalance measured, to fall within a region in which a dynamic imbalance is eliminated and, otherwise, removing said crankshaft, after it is finished, out of said mass-production line if said crankshaft, after it is finished, is judged to be out of said region, the improvement comprising:

(a) trial manufacturing a preselected number of crankshafts sampled from a manufacturing lot through said grinding process and said finishing process prior to mass-production of an entire lot;

(b) measuring dynamic imbalances of said preselected number of crankshafts after they have been ground and finished;

(c) analyzing a tendency of imbalances in crankshafts in said manufacturing lot to occur and calculating corrective outer diameters of said counterweights which enables crankshafts in said manufacturing lot, after being ground and finished, to fall within said region; and (d) feeding back data, representative of said corrective diameters of said counterweights of said crankshafts in said manufacturing lot, to said grinding process so as to grind all counterweights of crankshafts remaining in said manufacturing lot to said corrective outer diameters.

3. A method as defined in claim 1, wherein said specified one of said counterweights is one of two counterweights located at opposite ends of said crankshaft.

4. A method as defined in claim 1, wherein said dynamic imbalances are measured as deviations of centers of gravity of said crankshafts from intended centers of gravity of the same.

5. A method as defined in claim 1, wherein said crankshaft is a casting.

* * * * *